J. H. KUHNS.
WRENCH.
APPLICATION FILED AUG. 9, 1913.
1,094,221.
Patented Apr. 21, 1914.
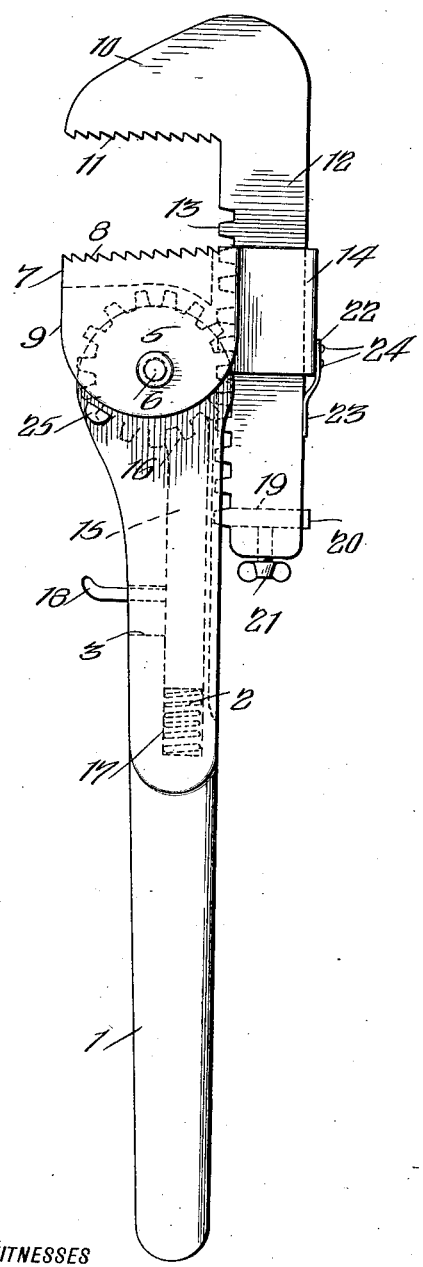
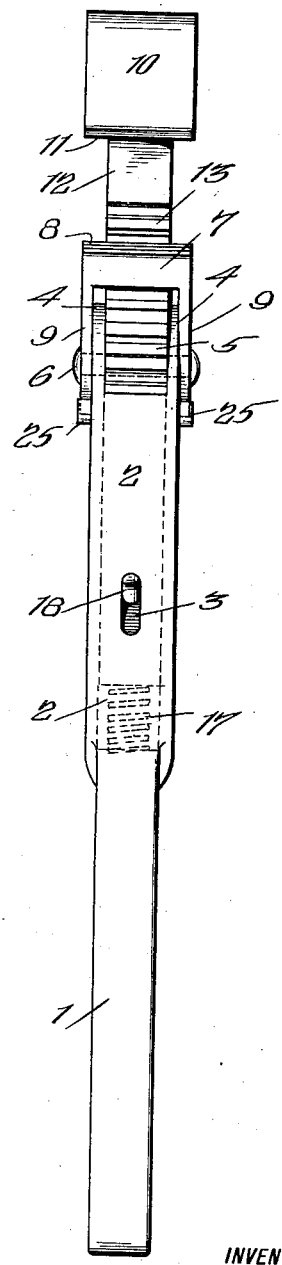
INVENTOR
JAMES H. KUHNS,
BY
ATTORNEYS

UNITED STATES PATENT OFFICE.

JAMES H. KUHNS, OF TULSA, OKLAHOMA.

WRENCH.

1,094,221. Specification of Letters Patent. Patented Apr. 21, 1914.

Application filed August 9, 1913. Serial No. 783,923.

*To all whom it may concern:*

Be it known that I, JAMES H. KUHNS, a citizen of the United States, and a resident of Tulsa, in the county of Tulsa and State of Oklahoma, have made certain new and useful Improvements in Wrenches, of which the following is a specification.

My invention is an improvement in wrenches, and has for its object to provide a wrench adapted for use in any character of worg, especially for turning pipes and other cylindrical objects, wherein the movable and the fixed jaws are connected by a rack and gear wheel, and wherein a pawl is provided for locking the gear wheel from rotation to hold the jaws in fixed position.

In the drawings: Figure 1 is a side view of the improved wrench, and, Fig. 2 is a front view.

The present embodiment of the invention comprises a shank or handle having one of its ends rounded, as shown at 1, to permit an easy grasp of the same, and the opposite end of the shank or handle is chambered, as shown at 2, the chamber extending longitudinally of the shank from the opposite end to the grip, and the front wall of the said chambered portion is slotted, as shown at 3, the slot communicating with the chamber. At the chambered end, the shank is transversely notched or recessed to form parallel laterally spaced bearing lugs or ears 4, and a gear wheel 5 is journaled between the lugs, on a journal pin 6. The fixed jaw is of approximately U-shape, comprising a body or jaw proper 7 having on one face a series of teeth 8, and having on the opposite face a pair of parallel laterally extending bearing lugs 9 extending alongside the lugs of the shank or handle, and the said bearing lugs are connected to the lugs 4 by means of the pivot pin 6, before mentioned. The ends of the pin 6 are headed, as shown in Fig. 2.

The movable jaw 10 is provided with teeth 11 on its inner face, and the said jaw is also provided with a laterally extending shank or extension bar which fits alongside the chambered portion of the handle or shank, and that face of the said shank or extension 12 adjacent to the teeth 11 is provided with a series of gear teeth 13. The shank or extension is square in cross section, and moves in a bearing 14 integral with the fixed jaw, and the teeth 13 of the shank mesh with the teeth of the gear wheel 5. It will be noted from an inspection of Fig. 1, that the upper face of the fixed jaw, that is the face having the teeth 8 and adjacent to the teeth 11 of the movable jaw, is beveled slightly toward the end remote from the shank or extension 12 of the movable jaw.

A slide bar 15 is arranged in the chamber 2 of the shank or handle, and the said bar is provided with teeth 16 for engaging the gear wheel 5, to lock the said gear wheel from angular movement. The slide bar is normally pressed toward the gear wheel by means of a coil spring 17 arranged between the inner end of the bar and the bottom of the chamber, and the bar may be moved against the resistance of the spring, by means of the finger piece 18 which extends through the slot 3, before mentioned. The outer end of the finger piece 18 is curved or bent toward the gear wheel, as shown, to prevent slipping of the finger from off the same, and it will be evident that when the finger piece is pressed away from the gear wheel, the teeth of the slide bar or pawl will be released from the gear wheel, to permit the gear wheel to rotate. That end of the shank or extension 12 remote from the movable jaw 10 is provided with a transverse opening or passage 19, and a pin or bar 20 is mounted to slide in the opening, the end of the said pin or bar adjacent to the gear wheel being shaped to correspond with the teeth 13 of the extension 12. A set screw 21 is threaded through an opening in the end of the shank or extension 12 into contact with the said pin or bar 20, to lock the said pin or bar in adjusted position. The purpose of the pin or bar 20 is to prevent the movable jaw and its extension from complete disengagement with the handle, and to also prevent the shank or handle 1 from swinging loose when the operator is grasping and releasing an object. The pin is adjusted by permitting it to engage the handle or shank 1, at its inner end, after which the set screw 21 is tightened. Since the pin projects through the extension 12 on the opposite face from the handle or shank 1, it will engage the bearing 14 to prevent the entire disengagement of the extension from the said bearing.

A plate spring having its ends offset laterally from each other, as indicated at 22 and 23, is provided for pressing the shank or extension 12 toward the gear wheel. The end 22 of the said spring is secured to the bearing 14, as indicated at 24, and the free end 23 of the said spring bears against that face of the shank or extension 12 remote from the gear wheel, thus holding the shank or extension 12 with its teeth 13 in close engagement with the teeth of the gear wheel.

The shank or handle 1 is provided with laterally extending lugs 25, the said lugs being adapted to engage the bearing lugs 9 of the fixed jaw, to limit the swinging movement of the shank or handle 1 with respect to said jaw. It is obvious that were the handle 1 to be swung to the left of Fig. 1, it might swing at right angles to the fixed jaw, unless the stops 25 were provided.

In operation, when the slide bar 15 or pawl is released from the gear wheel, the movable jaw 10 may be moved freely toward and from the fixed jaw, and as soon as the said bar is released, the spring 17 will press the bar or pawl into engagement with the gear wheel, thus locking the fixed jaw to the movable jaw. There is a limited movement of the jaws with respect to each other, in order to permit the jaws to engage and disengage from a tube for instance, without necessitating the release of the jaws. When the gripping jaws are engaged with a pipe, and pressure is made in a direction to turn the pipe, that is when the handle 1 is swung toward the left of Fig. 1, the jaws will be gripped tightly on the pipe. When this swinging movement is relaxed, the jaws may be moved apart slightly to permit a fresh grip to be taken.

I claim:

1. A wrench comprising a handle having one of its ends recessed, a gear wheel journaled in the recess, a gripping jaw having oppositely arranged lugs engaging opposite faces of the handle, a pivot pin connecting the lugs to the handle, the gear wheel being journaled on the said pin, said gripping jaw having a bearing extending laterally from the handle, a movable jaw having a shank engaging the bearing and moving substantially parallel with the handle, the shank having teeth for engagement by the gear wheel, normally active means for engaging the gear wheel to prevent rotation thereof, said means being releasable, and means for limiting the movement of the movable jaw away from the fixed jaw.

2. A wrench comprising a handle having one of its ends rounded to form a grip, and having at the other end a pair of longitudinally extending spaced bearing lugs, and having a recess extending longitudinally of the said handle from between the bearing lugs, and having a slot leading from the said recess intermediate the ends thereof to one edge of the said handle, a gear wheel journaled between the bearing lugs, a pawl in the recess for engaging the gear wheel, a spring normally pressing the pawl toward the gear wheel, a fixed jaw having bearing lugs engaging outside the lugs of the handle, a journal pin connecting the lugs upon which the gear wheel is journaled, said fixed jaw having a bearing extending on the opposite side of the handle from the finger piece, and a movable jaw having a lateral shank slidable in the bearing and provided with rack teeth for engagement by the gear wheel.

3. A wrench comprising a handle, said handle being transversely recessed at one end to form laterally spaced longitudinally extending bearing lugs, a fixed jaw having bearing lugs extending alongside the lugs of the handle, a gear wheel between the bearing lugs of the handle, a pivot pin connecting the lugs of the handle and the fixed jaw, the gear wheel being journaled on the pin, said fixed jaw having a bearing, a movable jaw having a lateral shank sliding in the bearing, said shank having teeth for engaging the gear wheel, a spring pressed pawl on the handle for engaging the gear wheel to prevent rotation thereof, and means for permitting the pawl to be moved away from the gear wheel.

4. A wrench comprising a handle, said handle being transversely recessed at one end to form laterally spaced longitudinally extending bearing lugs, a fixed jaw having bearing lugs extending alongside the lugs of the handle, a gear wheel between the bearing lugs of the handle, a pivot pin connecting the lugs of the handle and the fixed jaw, the gear wheel being journaled on the pin, said fixed jaw having a bearing, a movable jaw having a lateral shank sliding in the bearing, said shank having teeth for engaging the gear wheel, and a spring pressed pawl on the handle for engaging the gear wheel to prevent rotation thereof.

5. A wrench comprising a handle, a movable jaw pivoted to one end of the handle and having a bearing extending laterally from the handle, a fixed jaw having a shank slidable in the bearing and provided with teeth at the edge adjacent to the handle, a gear wheel journaled on the pivotal connection of the movable jaw and the handle and engaging the teeth of the shank, releasable means for locking the gear wheel from movement, said shank having a transverse opening at the end remote from the fixed jaw, a pin movable in the opening for engaging the bearing to prevent disengagement of the shank from the bearing, and means for securing the pin in adjusted position.

JAMES H. KUHNS.

Witnesses:
EDW. T. BADEN,
H. LEWIS CURRY.

Copies of this patent may be obtained for five cents each, by addressing the "Commissioner of Patents, Washington, D. C."